Dec. 10, 1957  D. P. RAMSEY  2,815,822
GUIDE PILOT FOR AN AUTOMOBILE HOOD
Filed Oct. 6, 1955  3 Sheets-Sheet 3
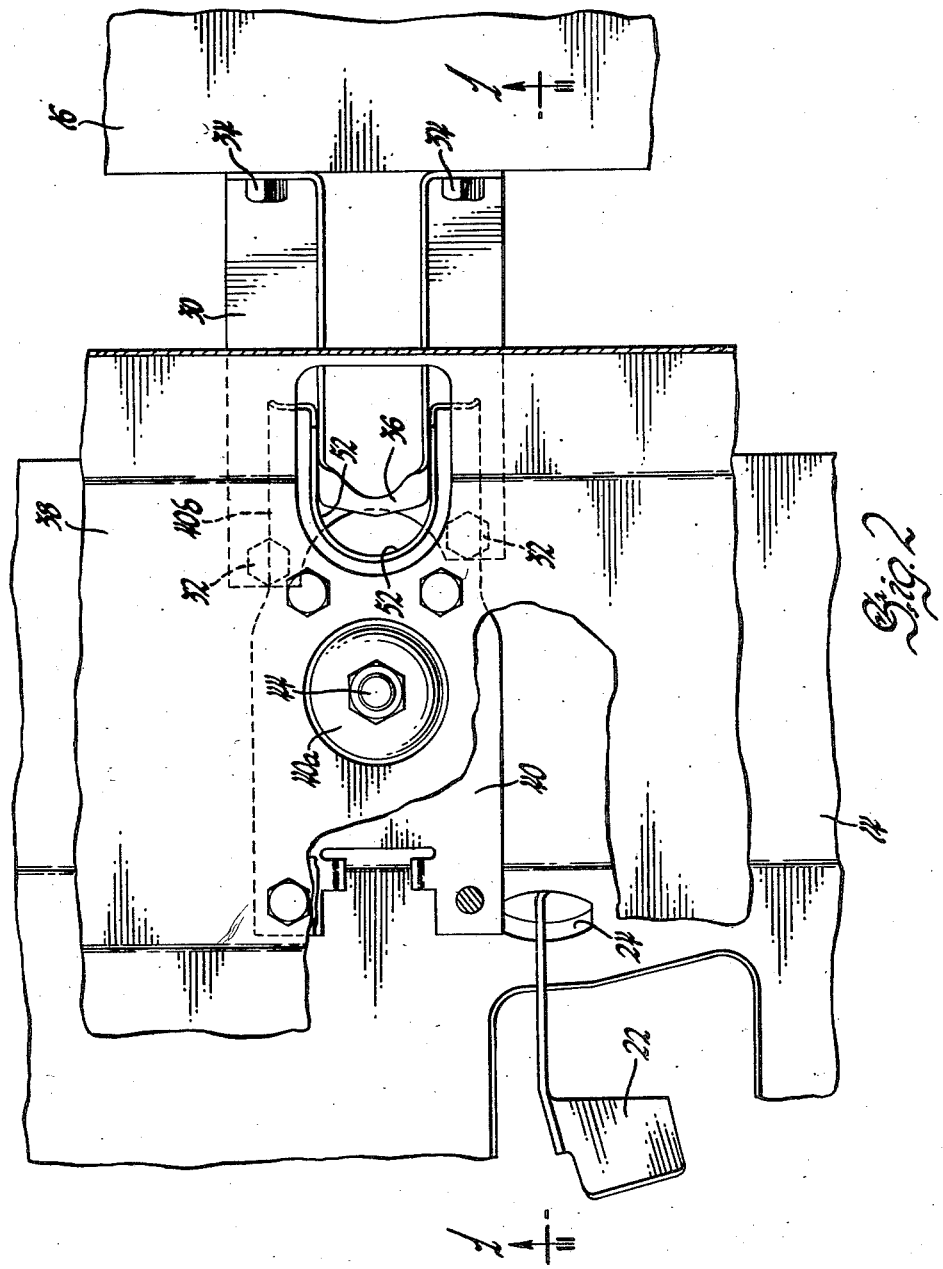
INVENTOR.
D. Paul Ramsey
BY
Paul Fitzpatrick
ATTORNEY

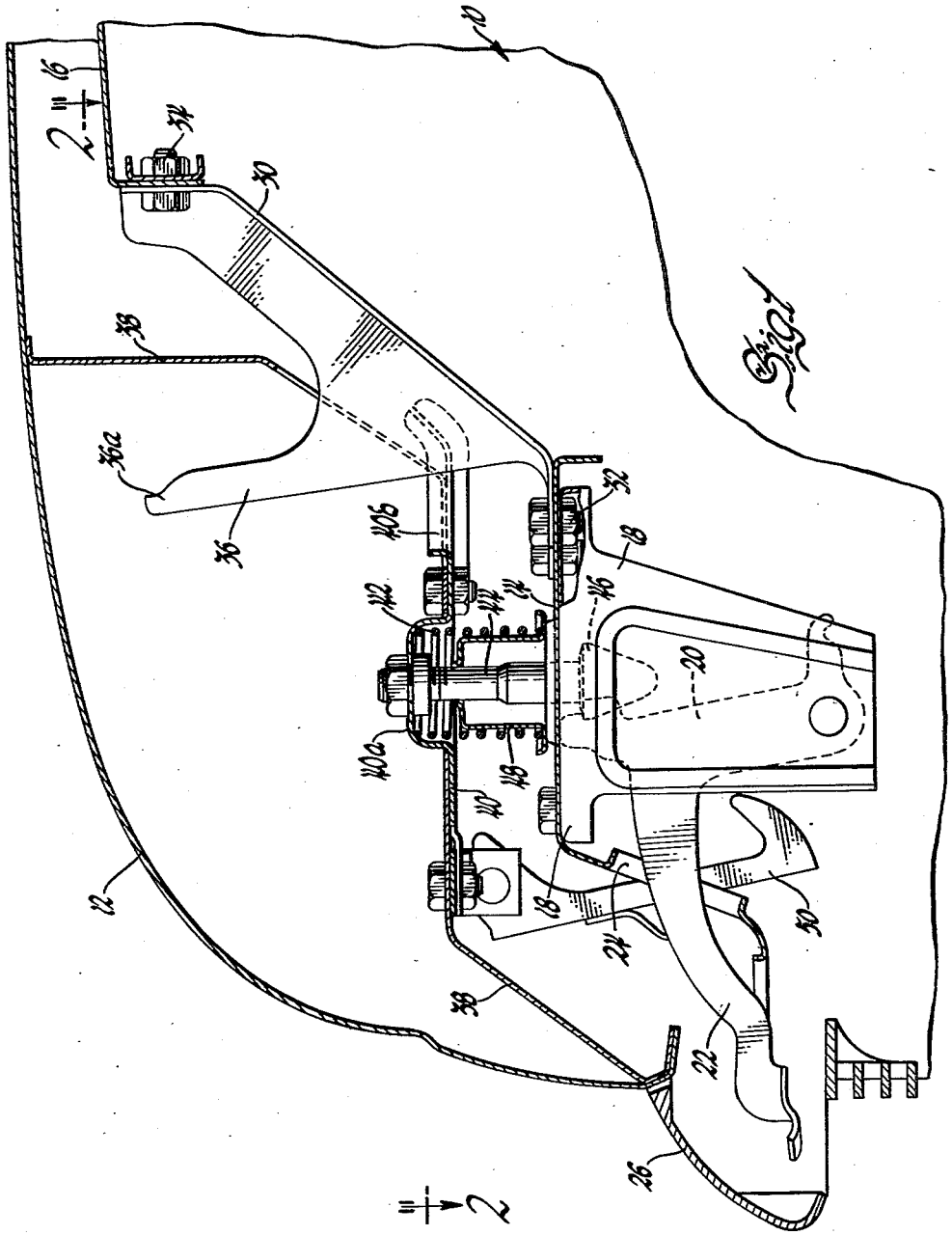

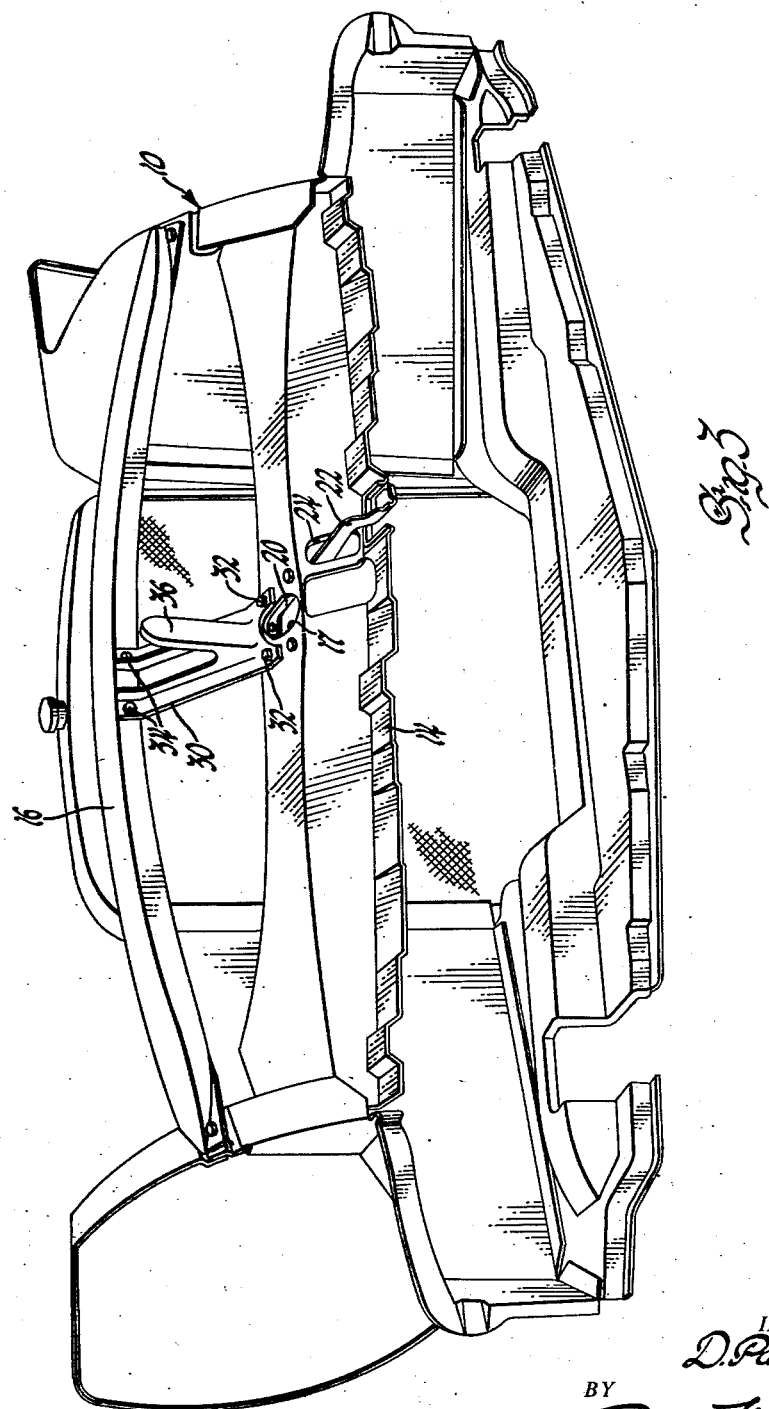

United States Patent Office 2,815,822
Patented Dec. 10, 1957

2,815,822

GUIDE PILOT FOR AN AUTOMOBILE HOOD

D. Paul Ramsey, Flint, Mich., assignor to General Motors Corporation, Detroit, Mich., a corporation of Delaware Application October 6, 1955, Serial No. 538,952

7 Claims. (Cl. 180—69)

This invention relates to a hood pilot, and more particularly to a hood pilot for alligator type automobile hoods.

One feature of the invention is that it provides an improved hood pilot; another feature of the invention is that it provides a hood pilot formed from a brace member on the automobile body; a further feature of the invention is that the pilot is bent integrally from the brace which interconnects the hood fastener latch mounting panel and the front fender tie bar; and still a further feature of the invention is that guide means for the pilot is formed in the plate which mounts the hood latching member on the hood so that the novel hood pilot utilizes no separate parts that are not already found on the automobile.

Other features and advantages of the invention will be apparent from the following description and from the drawings, in which:

Fig. 1 is a fragmentary vertical longitudinal section through the front portion of an automobile taken along the line 1—1 of Fig. 2 and showing the improved hood pilot;

Fig. 2 is a horizontal section taken along the line 2—2 of Fig. 1; and

Fig. 3 is an isometric view of the front portion of an automobile having the improved pilot, the hood, fenders, grille and bumper being removed.

This invention is particularly adapted for use on an automobile having an alligator type hood which is hinged adjacent its rear edge, and the purpose of the improved pilot is to align the hood panel between the front fenders when the hood is being closed. In the past, the hood has been quite rounded in transverse section so that it had a substantial amount of torsional rigidity. With a rigid hood of this type, there is little problem in avoiding scuffing the edges of the hood against the automobile fenders while the hood is being closed.

In certain automobile models, styling considerations require that the hood be substantially flat in transverse section so that it has little torsional rigidity. When a flat hood of this type is used, it is desirable to provide a pilot to align the hood longitudinally of the automobile as the hood is being closed to avoid scuffing the edges of the hood against the edges of the fenders. While various types of pilot devices have been proposed, they have had disadvantages, particularly in that they require additional parts which add expense in the manufacture of the automobile.

The hood pilot disclosed and claimed herein is bent integrally from an already existing brace member on the body and the guide with which the hood pilot cooperates comprises a slot in an already existing latch mounting panel on the hood so that no additional parts are required. The pilot is so located and arranged that it engages the guide as the hood is being closed prior to the time that the conventional hood latching stud enters its latch opening.

Referring now more particularly to the drawings, an automobile body 10 has an alligator type hood 12 for covering the engine compartment, the hood being hingedly mounted adjacent its rear edge in conventional manner. Extending transversely across the body, there is a hood fastener latch mounting panel 14 and a front fender tie bar 16 which is spaced rearwardly and above the latch mounting panel. At the transverse center of the latch mounting panel there is an opening 17 for receiving a primary hood latch member later to be described. A latch plate 18 is bolted to the underside of the panel 14 and the main hood latching members are carried by this plate including a latch lever 20 and a handle 22 which extends forwardly through an opening 24 in the panel 14 and terminates beneath the automobile grille 26 at a location where it may be reached from the front end of the car. The front fender tie bar 16 is a strengthening member for the front end of the body and also serves to support the top portion of the automobile radiator.

The two transversely extending support members 14 and 16 are conventional in automobile construction, and they conventionally are interconnected adjacent their centers by a brace 30 which is bolted at 32 to the latch mounting panel 14 and which is bolted at 34 to the tie bar 16. An upstanding hood pilot 36 is integrally formed with the brace 30, being bent therefrom during the stamping of the brace. A cooperating guide for the pilot 36 is provided on the movable hood 12. Adjacent the forward end of the hood there is a support bracket 38 upon which is mounted a latch support plate 40. This plate has a central inverted cup-shaped portion 40a which seats a compression spring 42 surrounding a latching stud 44. The latching stud has a conical head 46 which cooperates with the latch lever 20 to form the primary hood latching means as is well understood in the art. An inverted spacer cup 48 is mounted inside the compression spring 42 and together with the spring 42 provides a kick-up means for raising the front end of the hood a couple of inches when the primary latch is released. A conventional safety latch 50 is also provided for holding the hood in the event the primary latch inadvertently works loose.

The latch mounting plate 40 has a rearwardly extending portion 40b formed with a slot 52 adapted to receive the pilot 36 when the hood is being closed. As will be apparent from Fig. 1, the tapered end 36a of the hood pilot enters the slot 52 while the conical head 46 of the latching stud is still spaced above the latch plate 18 and while the front end of the hood is still open several inches. As the hood closing movement continues, the pilot 36 and guide slot 52 align the hood longitudinally of the car to prevent the edges of the hood from scraping the automobile fenders.

This hood pilot utilizes no parts other than parts found in existing construction and provides a simple and efficient hood guide without adding materially to the cost of the manufacture of the automobile.

While I have shown and described one embodiment of my invention, it is capable of many modifications. Changes, therefore, in the construction and arrangement may be made without departing from the spirit and scope of the invention as set forth in the appended claims.

I claim:

1. In an automobile having a body with a hingedly mounted hood, apparatus of the character described, including: means for latching the hood to the body; a pair of spaced support members on the body; a brace interconnecting said members, said brace being spaced from said latching means and having an upstanding hood pilot integrally formed therewith; and a guide plate on the hood having an opening for receiving the pilot to align the hood as it is being closed.

2. In an automobile having a body with a hingedly mounted hood, apparatus of the character described, including: means for latching the hood to the body; a pair of spaced support members extending transversely across the body; a brace interconnecting said members, said brace being spaced from said latching means and having an upstanding hood pilot integrally formed therewith; and a guide plate on the hood having a slot for receiving the pilot to align the hood as it is being closed.

3. In an automobile having a body with a hingedly mounted alligator-type hood, apparatus of the character described, including: means for latching the hood to the body, including a hood fastener latch mounting panel extending transversely across the body near the front thereof; a front fender tie bar extending transversely across said body above and behind said panel; a sheet metal brace interconnecting said panel and tie bar, said brace being spaced above and behind the latch mounting panel and having an integral upstanding hood pilot bent therefrom; and a guide plate on the hood having an opening for receiving the pilot to align the hood longitudinally of the body as the hood is being closed.

4. In an automobile having a body with a hingedly mounted hood and latching means on the hood and on the body, apparatus of the character described, including: a mounting panel for the latching means extending transversely across the body near the front thereof; a front fender tie bar extending transversely across the body above and behind said panel, a sheet metal brace interconnecting said members, said brace having an integral upstanding hood pilot bent therefrom; and a latch supporting plate on the hood having a slot for receiving the pilot to align the hood longitudinally of the body as the hood is being closed.

5. Apparatus of the character described, including: an automobile body; a hood movably mounted on said body; means for latching said hood on said body; a mounting panel for the latching means extending transversely across the body near the front thereof; a front fender tie bar extending transversely across the body above and behind said panel; a sheet metal brace interconnecting said members adjacent the transverse center of the body, said brace having an integral upstanding hood pilot bent therefrom; and a latch supporting plate on the hood having a slot for receiving the pilot to align the hood longitudinally of the body as the hood is being closed.

6. Apparatus of the character described, including: an automobile body; a hood movably mounted on said body; means for latching the hood to the body; a pair of spaced support members extending transversely across the body near the front thereof, one member being above and behind the latching means; a sheet metal brace interconnecting said members, said brace being spaced above and behind said latching means and having an integral upstanding hood pilot bent therefrom; and a guide plate on the hood having an opening for receiving the pilot to align the hood as it is being closed.

7. Apparatus of the character described, including: an automobile body; a hood movably mounted on said body; latch parts on the hood and body for latching the hood to the body; a pair of spaced support members on the body, one being above and behind the latch part on the body; a brace interconnecting said members, said brace having an upstanding hood pilot integrally formed therewith; and a guide plate on the hood having an opening for receiving the pilot before engagement of the latch parts to align the hood as it is being closed.

References Cited in the file of this patent

UNITED STATES PATENTS

| | | |
|---|---|---|
| 2,126,141 | Saunders | Aug. 9, 1938 |
| 2,737,254 | Bayley | Mar. 6, 1956 |